United States Patent

Hsu

(10) Patent No.: US 11,748,022 B2
(45) Date of Patent: Sep. 5, 2023

(54) METHOD AND APPARATUS FOR CONTROLLING DIFFERENT TYPES OF STORAGE UNITS

(71) Applicant: Silicon Motion, Inc., Zhubei (TW)

(72) Inventor: Sheng-I Hsu, Hsinchu County (TW)

(73) Assignee: Silicon Motion, Inc., Zhubei (TW)

( * ) Notice: Subject to any disclaimer, the term of this patent is extended or adjusted under 35 U.S.C. 154(b) by 64 days.

(21) Appl. No.: 17/519,685

(22) Filed: Nov. 5, 2021

(65) Prior Publication Data

US 2022/0057957 A1 Feb. 24, 2022

Related U.S. Application Data

(63) Continuation of application No. 16/712,160, filed on Dec. 12, 2019, now Pat. No. 11,199,991.

(60) Provisional application No. 62/787,810, filed on Jan. 3, 2019.

(30) Foreign Application Priority Data

Jun. 5, 2019 (CN) .......................... 201910486615.2

(51) Int. Cl.
 *G06F 3/06* (2006.01)
(52) U.S. Cl.
 CPC .......... *G06F 3/0653* (2013.01); *G06F 3/0604* (2013.01); *G06F 3/068* (2013.01); *G06F 3/0656* (2013.01); *G06F 3/0679* (2013.01); *G06F 3/0683* (2013.01)
(58) Field of Classification Search
 CPC .... G06F 3/0653; G06F 3/0604; G06F 3/0656; G06F 3/0679; G06F 3/068; G06F 3/0683
 See application file for complete search history.

(56) References Cited

U.S. PATENT DOCUMENTS

| 8,135,901 B2 | 3/2012 | Oh et al. |
| 8,898,374 B2 | 11/2014 | Yang |
| 2007/0288683 A1 | 12/2007 | Panabaker et al. |
| 2008/0104309 A1* | 5/2008 | Cheon ................. G06F 12/0246 711/E12.008 |
| 2009/0241103 A1 | 9/2009 | Pennisi et al. |
| 2011/0066837 A1 | 3/2011 | Lee et al. |
| 2011/0119430 A1* | 5/2011 | Lai ....................... G11C 16/349 711/E12.001 |
| 2012/0023283 A1 | 1/2012 | Yang |

(Continued)

FOREIGN PATENT DOCUMENTS

| CN | 101661473 A | 3/2010 |
| CN | 102346652 A | 2/2012 |

(Continued)

OTHER PUBLICATIONS

English translation of the Taiwanese Search Report dated May 26, 2020 for Application No. 108119438.

*Primary Examiner* — Jae U Yu
(74) *Attorney, Agent, or Firm* — Birch, Stewart, Kolasch & Birch, LLP

(57) ABSTRACT

The invention introduces an apparatus for controlling different types of storage units, at least including: an interface and a processing unit. The interface connects at least two types of storage units, which include at least a nonvolatile hybrid memory. The processing unit is configured to operably access data to the different types of storage units through the interface.

20 Claims, 7 Drawing Sheets

(56) References Cited

U.S. PATENT DOCUMENTS

| | | | |
|---|---|---|---|
| 2012/0131261 A1* | 5/2012 | Ferrari | G06F 12/0246 |
| | | | 711/135 |
| 2013/0170293 A1* | 7/2013 | Sprouse | G11C 11/5628 |
| | | | 365/185.03 |
| 2014/0164675 A1 | 6/2014 | Ehrlich et al. | |
| 2017/0060434 A1 | 3/2017 | Chang et al. | |
| 2018/0081543 A1 | 3/2018 | Muchherla et al. | |
| 2018/0173441 A1 | 6/2018 | Cargnini et al. | |

FOREIGN PATENT DOCUMENTS

| | | |
|---|---|---|
| CN | 104361113 A | 2/2015 |
| CN | 106484628 A | 3/2017 |
| CN | 108205499 A | 6/2018 |
| RU | 2008 148 129 A | 6/2010 |
| TW | 1442222 B | 6/2014 |

\* cited by examiner

METHOD AND APPARATUS FOR CONTROLLING DIFFERENT TYPES OF STORAGE UNITS

CROSS-REFERENCE TO RELATED APPLICATIONS

This is a Continuing patent application of and claims the benefit of priority to U.S. patent application Ser. No. 16/712,160, filed on Dec. 12, 2019, which claims the benefit of priority to U.S. Provisional Application Ser. No. 62/787,810, filed on Jan. 3, 2019; and Patent Application No. 201910486615.2, filed in China on Jun. 5, 2019; the entirety of which is incorporated herein by reference for all purposes.

BACKGROUND

The disclosure generally relates to storage devices and, more particularly, to methods and apparatuses for controlling different types of storage units.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation).

Storage space of a mass storage device may be practiced by NAND flash memory device including numerous Tripe Level Cells (TLCs) for storing huge data. However, the programming of TLCs consumes longer time. TLCs additionally require time to perform wear leveling operations for extending their life service. The application flexibility is not enough for a host if the storage space of the mass storage device incorporating with only TLCs, for example, unsuitable for fast retrieving cold data. Thus, it is desirable to have a method and an apparatus for controlling different types of storage units to overcome the above limitations.

SUMMARY

In an aspect of the invention, an apparatus for controlling different types of storage units is introduced to at least include: an interface and a processing unit. The interface is connected to at least two types of storage units, which include at least a nonvolatile hybrid memory. The processing unit is configured to operably access data of the different types of storage units through the interface.

In another aspect of the invention, a method for controlling different types of storage units, performed by a processing unit when loading and executing software or firmware instructions, is introduced to include: configuring an interface in a first operating mode, wherein the interface comprises a plurality of channels, each channel is connected to a first type and a second type of storage units, and the first operating mode corresponds to the first type of storage units; driving the interface to issue a first signal to enable the first type of storage units of different channels; driving the interface to access data of the first type of storage units, and reconfiguring the interface in a second operating mode corresponding to the second type of storage units before accessing data of the second type of storage units.

In still another aspect of the invention, a method for controlling different types of storage units, performed by a processing unit when loading and executing software or firmware instructions, is introduced to include: during a system booting stage, initializing a non-volatile hybrid memory; reading a parameter for configuring a flash memory, and an In-System Programming (ISP) code from the hybrid memory; initializing the flash memory according to the parameter; and executing the ISP code to enter a normal mode and wait for a command issued by a host.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
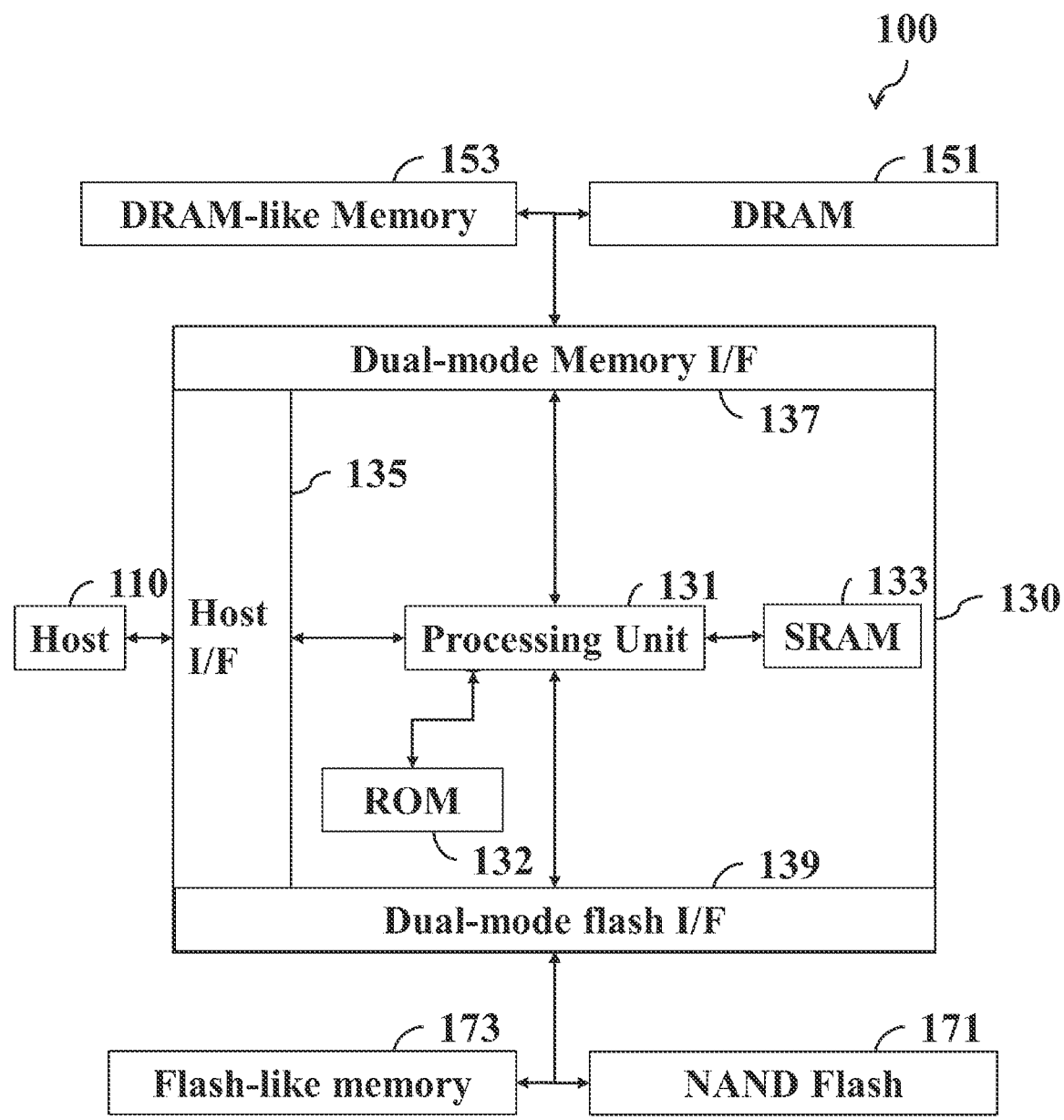
FIG. 1 is the system architecture of a flash memory device according to an embodiment of the invention.

Refer to FIG. 1. The generic system architecture 100 includes a host 110, a memory controller 130, a dynamic random access memory (DRAM) 151, a DRAM-like memory 153, a flash memory 171 and a flash-like memory 173. The system architecture 100 may be practiced in a Personal Computer (PC), a laptop PC, a notebook, a mobile phone, a digital camera, a digital recorder, or other consumer electronic products. The memory controller 130 is an application-specific Integrated circuit (ASIC) for controlling the data retrieval to the DRAM 151, the DRAM-like memory 153, a flash memory 171 or a flash-like memory 173, which includes a processing unit 131, a read-only memory (ROM) 132, a host interface (I/F) 135, a dual-mode memory I/F 137 and a dual-mode flash I/F 139. The memory controller 130, the DRAM 151, the DRAM-like memory 153, the flash memory 171 or the flash-like memory 173 may be disposed on a data storage device. The data storage device can communicate with a host 110 and execute host commands issued by the host 110.

In some embodiments for reducing hardware cost, the data storage device may be simplified to include any two or three of the DRAM 151, the DRAM-like memory 153, the flash memory 171 and the flash-like memory 173. In alternative embodiments for reducing hardware cost, the data storage device may be simplified to exclude the DRAM 151 and the DRAM-like memory 153, such that the memory controller 130 can be simplified to exclude the dual-mode memory I/F 137 or disable the functions of the dual-mode memory I/F 137.

The flash memory 171 provides huge storage space, typically in hundred gigabytes (GBs) or even terabytes (TBs), for storing huge user data, for example, high-resolution images, videos, or others. Memory units of the flash memory 171 may be Triple Level Cells (TLCs) or Quad-Level Cells (QLCs). The DRAM 151 may be used to buffer user data come from the host 110 or the flash memory 171 and also buffer a portion of or all the logical-physical address mapping (L2P) table. The DRAM 151 may store firmware and variables required by the data storage device in operation.

The memory controller 130 includes a processing unit 131 and communicates with the host 110 through the host I/F 135. The host I/F 135 may be Universal Flash Storage (UFS), Non-Volatile Memory Express (NVMe), Universal Serial Bus (USB), Advanced Technology Attachment (ATA), Serial Advanced Technology Attachment (SATA), Peripheral Component Interconnect Express (PCI-E), or others. Any of the host 110 and the processing unit 131 may be implemented in numerous ways, such as with general-purpose hardware (e.g., a single processor, a multiprocessor or graphics processing units (GPUs) capable of parallel computations, or others) that is programmed using firmware or software instructions to perform the functions recited herein. A multiprocessor is a single computing component with two or more independent processors (called cores), which read and execute program instructions.

The processing unit 131 may communicate with the flash memory 171 via the dual-mode flash I/F 139, for example, using Open NAND Flash Interface (ONFI), DDR toggle, or others. The processing unit 131 may communicate with the DRAM 151 via the dual-mode memory I/F, for example, using Double Data Rate Third Generation (DDR3), Double Data Rate Fourth Generation (DDR4), or others.

The DRAM-like memory 153 may be referred to as a hybrid memory, which can be implemented in a Phase-Change Memory (PCM) or a magnetoresistive memory. The DRAM-like memory 153 has faster data-access capability and thus can be treated as a data buffer for storing temporary data. Moreover, the DRAM-like memory 153 provides long-time data-storage capability and thus can be treated as a data storage medium. The DRAM-like memory 153 employs a similar operating I/F with the DRAM 151. The access speed of the DRAM-like memory 153 is, for example, about one tenth of that of the DRAM 151 while the data volume of the DRAM-like memory 153 is, for example, about ten times of that of the DRAM 151.

The flash-like memory 173 may be referred to as a hybrid memory, which is a NAND flash memory essentially. The memory cells of the flash-like memory 173 are SLCs. A data length of one page thereof is configured as 512 B and thus can provide long-time data-storage capability. The flash-like memory 173 employs a similar operating I/F with the flash memory 171. The access speed of the flash-like memory 173 is, for example, about ten times of that of the flash memory 171 while the data volume of the flash-like memory 173 is, for example, about one tenth of that of the flash memory 171.

The processing unit 131 communicates with the DRAM-like memory 153 and the flash-like memory 173 via a memory-like I/F and a flash-like I/F, respectively. The DRAM-like memory 153 and the flash-like memory 173 are called as hybrid memory because they have non-volatile data-storage characteristics and their access speed falls between that of the flash memory 171 and the DRAM 151.

Additionally, comparing with the flash memory 171, the hybrid memory has better capability in endurance and data retention. Therefore, unlike data stored in the flash memory 171 typically requiring Error-Correcting Code (ECC) protection with higher-correction capability, for example, Low-Density Parity Check Code (LDPC), data stored in the hybrid memory can be protected by ECC with lower-correction capability, for example, Bose-Chaudhuri-Hocquenghem (BCH) code. Taking 1 KB user data as an example, BCH code can be used to correct at most 72 error bits while LDPC can be used to correct at most 128 error bits.

Moreover, as to the latency of data retrieval, the DRAM 151 is better than the hybrid memory and the hybrid memory is better than the flash memory 171. In terms of the aforementioned characteristic differences, the hybrid memory provides wider application potentials, for example, storing information required in system booting, operating as a Level-4 cache for the host 110, or others.

Since the flash-like memory 173 employs a flash memory as a data storage medium, a flash-like I/F is similar with a flash I/F and some pin definitions of the flash-like and flash I/Fs are compatible or the same, but others are different. Thus, the dual-mode flash IF 139 is extended based on the flash I/F. Similarly, a memory-like I/F is similar with a memory I/F and some pin definitions of the memory-like and memory I/Fs are compatible or the same, but others are different. Thus, the dual-mode memory I/F 137 is extended based on the memory I/F. In other words, the dual-mode flash I/F 139 and the dual-mode memory I/F 137 are integrated I/Fs to access different types of flash memory and RAM, respectively. Additionally, the dual-mode flash I/F 139 preferably identifies a page the smallest unit that data can be programmed, and a block the smallest unit that can be erased. The dual-mode memory I/F 137 preferably identifies a bit the smallest unit that data can be written.

Figure 2:
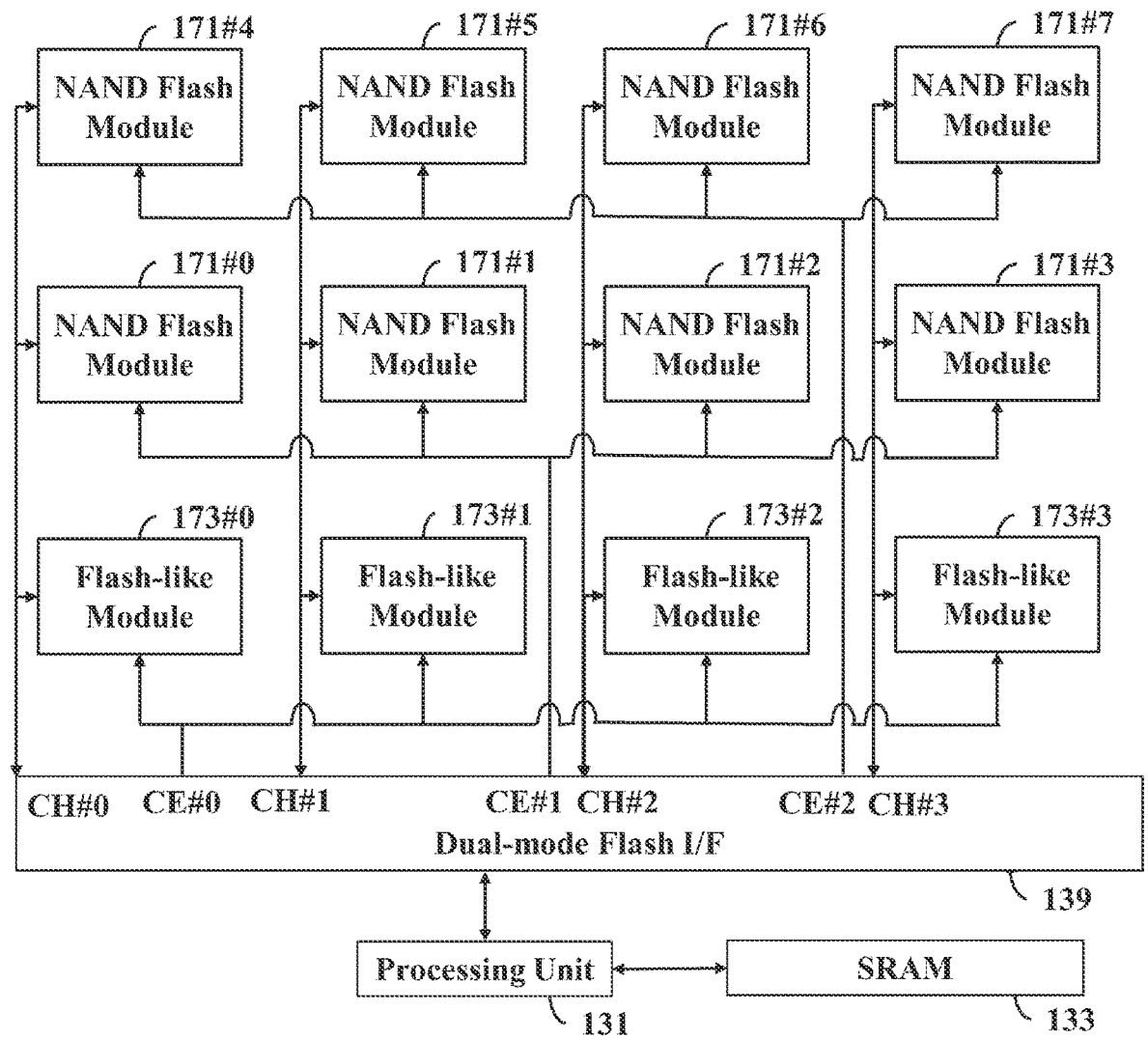
FIG. 2 illustrates a configuration of connections between a dual-mode flash interface (I/F), a flash memory and a flash-like memory according to an embodiment of the invention.

FIG. 2 illustrates a configuration of connections between the dual-mode flash I/F 139, the flash memory 171 and the flash-like memory 173 according to an embodiment. The dual-mode flash I/F 139 may include four I/O channels (hereinafter referred to as channels CHs) CH #0 to CH #3. Each channel CH may be connected to the same type or different types of storage modules, for example, one flash-like memory module and two flash modules, which are identified by Logical Unit Numbers (LUNs). For example, the channel CH #0 is connected to the flash-like memory module 173 #0 and the flash modules 171 #0 and 171 #4. In other words, different types of flash storage modules can share one channel. With this connection configuration, the storage modules of multiple channels CH may be accessed in a multi-channel mode to improve the data access performance. The processing unit 131 may issue the Chip Enable (CE) signal CE #0 and access data of the flash-like modules 173 #0 to 173 #3 of the channels CH #0 to CH #3 in a multi-channel mode. The processing unit 131 may issue the CE signal CE #1 and access data of the flash modules 171 #0 to 171 #3 of the channels CH #0 to CH #3 in a multi-channel mode.

Figure 3:
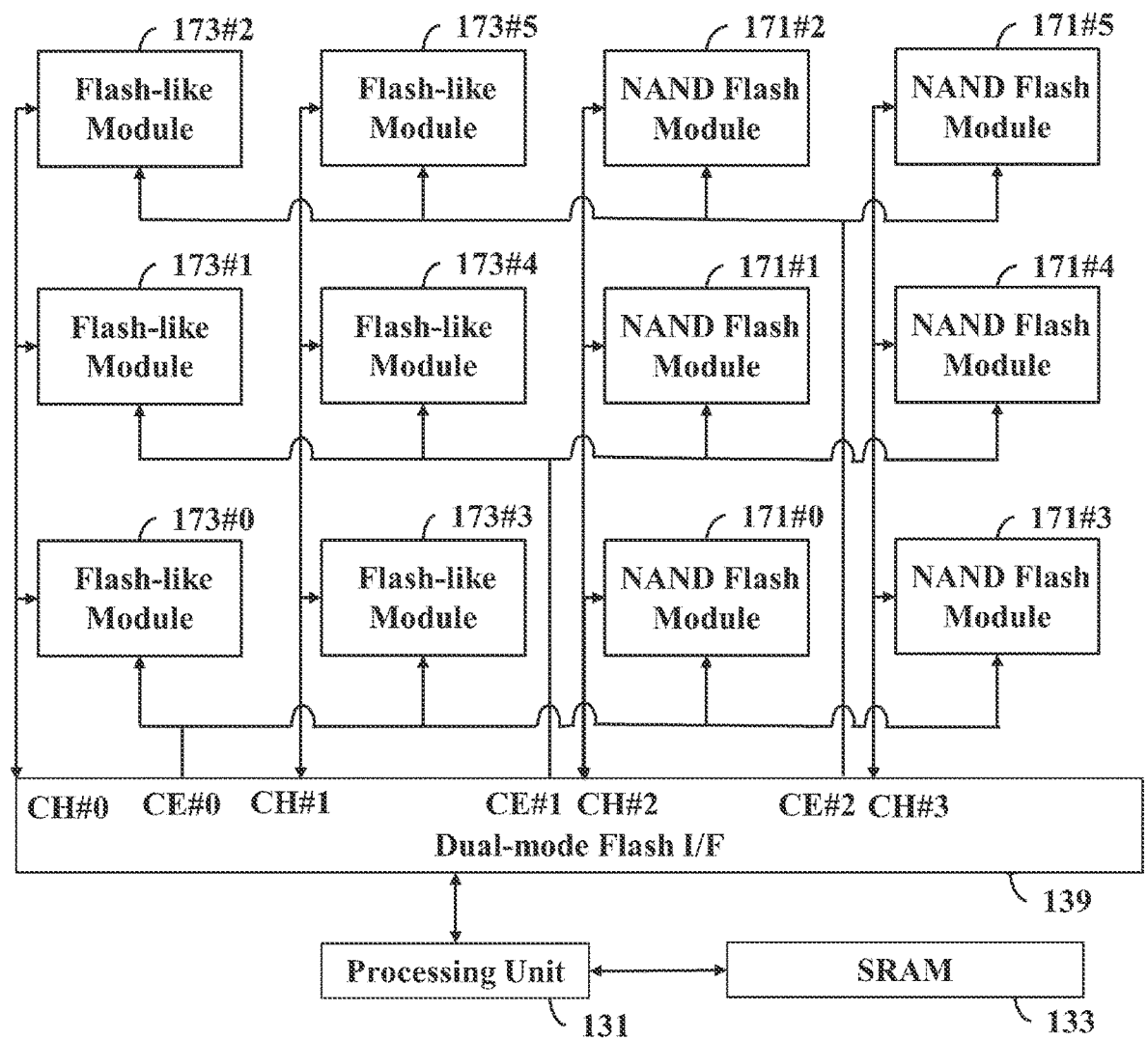
FIG. 3 illustrates a configuration of connections between a dual-mode flash I/F, a flash memory and a flash-like memory according to another embodiment of the invention.

FIG. 3 illustrates a configuration of connections between the dual-mode flash I/F 139, the flash memory 171 and the flash-like memory 173 according to another embodiment. Each channel is connected to the same type of storage modules only, for example, each of the channels CH #0 and CH #1 is connected to the flash-like modules only and each of the channels CH #2 and CH #3 is connected to the flash modules only. With this connection configuration, storage modules of multiple channels may be accessed in a multi-channel mode to improve the data access performance. The processing unit 131 may issue the CE signal CE #0 and access flash-like modules 173 #0 and 173 #3 of the channels CH #0 and CH #1 in a multi-channel mode. The processing unit 131 may assert or de-assert the CE signal CE #0 and access flash modules 171 #0 and 171 #3 of the channels CH #2 and CH #3 in a multi-channel mode.

The dual-mode flash I/F 139 is equipped with 30 pins and Table 1 shows the pin functions of the dual-mode flash I/F:

TABLE 1

| Pin Number | ONFI (Async) | Toggle | ONFI (Sync) | Flash-like I/F |
|---|---|---|---|---|
| 0-7 | Data[0:7] | Data[0:7] | Data[0:7] | Data[0:7] |
| 8 | CE# | CE# | CE# | CS |
| 9 | ALE | ALE | ALE | Select_In |
| 10 | CLE | CLE | CLE | CA |
| 11 | RE# | RE# | R/W | x |
| 12 | RE_c | RE_c | RE_c | x |
| 13 | WE# | WE# | Clock | Clock |
| 14 | R/B# | R/B# | R/B# | x |
| 15 | WP# | WP# | WP# | x |
| 16 | DQS_c | DQS_c | DQS_c | x |
| 17 | DQS# | DOS# | DQS# | DQS# |
| 18 | ZQ | ZQ | ZQ | ZQ |
| 19-26 | x | x | Data[8:15] | x |
| 27 | x | x | x | Clock_c |
| 28 | x | x | x | CKE |
| 29 | x | x | x | ODT |

As shown in Table 1, the dual-mode flash I/F 139 may be configured as a flash I/F, such as ONFI Sync, ONFI Async, DDR Toggle, etc., thereby enabling the processing unit 131 to communicate with the flash modules each other. In addition, the dual-mode flash I/F 139 may be configured as a flash-like I/F, thereby enabling the processing unit 131 to communicate with the flash-like modules each other. The letter "x" indicates that the corresponding pin is floating, reserved, or manufacturer-proprietary. The letter "#" indicates a negative edge-triggered. The letter "c" indicates the complement.

The dual-mode flash I/F 139 may include registers mapping to pins of the storage modules, enabling the processing unit 131 to set output parameters to designated pins of the storage modules, for example, the predefined voltage level, the triggering type (such as assertion, de-assertion or no-function), the swinging (Y/N), the clock frequency, and the like. In an example, suppose that the dual-mode flash I/F 139 is configured as ONFI Sync, ONFI Async or DDR Toggle, the processing unit 131 may set the corresponding register to adjust the predefined voltage output to the pin #8 to a high voltage. The processing unit 131 may set the triggering type and the swinging (Y/N) for the pin #8 to de-assertion and NO through the corresponding registers, respectively. Suppose that the dual-mode flash I/F 139 is configured as the flash-like I/F, the processing unit 131 may set the corresponding register to adjust the predefined voltage output to the pin #8 to a low voltage. The processing unit 131 may set the triggering type and the swinging (Y/N) for the pin #8 to assertion and NO through the corresponding registers, respectively. In another example, suppose that the dual-mode flash I/F 139 is configured as ONFI Sync, the processing unit 131 may set the corresponding registers to configure the swinging (Y/N) as YES and adjust the clock frequency to a frequency that can be supported by the flash modules for the pin #13. Suppose that the dual-mode flash I/F 139 is configured as the flash-like I/F, the processing unit 131 may set the corresponding registers to configure the swinging (Y/N) as YES and adjust the clock frequency to a frequency that can be supported by the flash-like modules for the pin #13.

Each storage module may feed-in an independent CE or Chip Select (CS) signal. The processing unit 131 may access data stored in the storage modules of different channels CH #0 to CH #3 through the dual-mode flash I/F 139 in parallel. Specifically, the processing unit 131 issues one of the CE signals CE #0 to CE #3 to enable the designated storage module of every channel, and then, access data stored in the enabled storage modules in parallel through the shared data buses Data[0:7] or Data[0:7] and Data[8:15] of the channels CH #0 to CH #3. For example, the processing unit 131 sends commands, Logical Block Addresses (LBAs) to be read, user data to be written, or others to the enabled storage modules, or receives user data, replied messages, or others from the enabled storage modules through the shared data buses. In addition, each channel can be used to exchange control signals with the enabled storage modules, such as Address Latch Enable (ALE), Command Latch Enable (CLE), Read Enable (RE), Complement RE (RE_c), Ready/Busy (R/B), Write Protect (WP), Command Address (CA), Clock, Complement Clock (Clock_c), Clock Enable (CKE), DQS, ZQ, On-Die Termination (ODT), etc.

Furthermore, the pin functions may be redefined to reduce the pin count of the dual-mode flash I/F. For example, the ODT function of the flash-like I/F may be moved to pin #15, making pin #15 is used as WP for the flash I/F and ODT for the flash-like I/F. Therefore, pin #29 of the dual-mode flash I/F 139 can be removed therefrom.

After the connection configurations have been set, the manufacturer of the memory controller 130 may program the connection configurations into the ROM, thereby enabling the processing unit 131 to drive the dual-mode flash I/F 139 according to the settings of the ROM. In alternative embodiments, while the memory controller 130 enters an initiation phase, the processing unit 131 outputs an operating command to the storage modules in a row according to the flash I/F or the flash-like I/F, for example, a data read command of the flash I/F. If any storage module can reply with correct data, then the processing unit 131 determines that the storage module is a flash memory module. Otherwise, the processing unit 131 determines that the storage module is a flash-like memory module. In alternative embodiments, the storage module of the channel CH #0 that is controlled by CE #0 is fixed to a flash memory module in system design and the connection configurations is stored in this flash memory module. While the memory controller 130 enters an initiation phase, the processing unit 131 reads the flash memory module of CE #0 of CH #0 through the flash I/F to obtain the connection configurations.

Based on the connections as shown in FIG. 2, the processing unit 131 may employ different communications protocols or use different operating modes to drive different types of the flash modules. Before another type of the flash modules are enabled, the processing unit 131 may reconfigure the dual-mode flash I/F 139. For example, the processing unit 131, in the system booting, configures the dual-mode flash I/F 139 in the operating mode for accessing data of the flash-like modules 173. Next to the successful configurations, the processing unit 131 drives the dual-mode flash I/F 139 to issue the CE signal CE #0 to enable the flash-like modules 173 #0 to 173 #3, and then, obtain program instructions, mapping tables, data and the like required in the system booting therefrom. After the system has been boot successfully, the processing unit 131 may reconfigure the dual-mode flash I/F 139 in the operating mode for accessing data of the flash modules 171. Next to the successful reconfigurations, the processing unit 131 drives the dual-mode flash I/F 139 to issue the CE signal CE #1 or CE #2 to enable the flash modules 171 #0 to 171 #3 or 171 #4 to 171 #7, and then, accesses user data and perform a wide range of background operations, such as a Garbage Collection (GC) process, a Wear Leveling (WL) process, etc., to improve the storage capability of the flash modules 171 therewith. During the retrieval of user data, if attempting to obtain the program instructions, the mapping tables or data of the flash-like modules 173, the processing unit 131 may reconfigure the dual-mode flash I/F 139 in the operating mode for accessing data of the flash-like modules 173 before issuing the CE signal CE #0 to enable the flash-like modules 173.

In some embodiments, suppose that the processing unit 131 is a multiprocessor capable of parallel computations, each processor core may handle designated channels to access data of a portion of storage modules. For example, one core is responsible for handling the channels CH #0 and CH #1 while another core is responsible for handling the channels CH #2 and CH #3. In alternative embodiments, suppose that the connections between the processing unit 131 and the storage modules are configured as shown in FIG. 3, one or more cores are dedicated to access data of the flash modules while the other cores are dedicated to access data of the flash-like modules. Thus, the connection configurations as shown in FIG. 3 make the processing unit 131 spend no time to reconfigure the dual-mode flash I/F 139. But, comparing with the connections as shown in FIG. 2, the bandwidth for parallel processes of the dual-mode flash I/F 139 is reduced.

Figure 4:
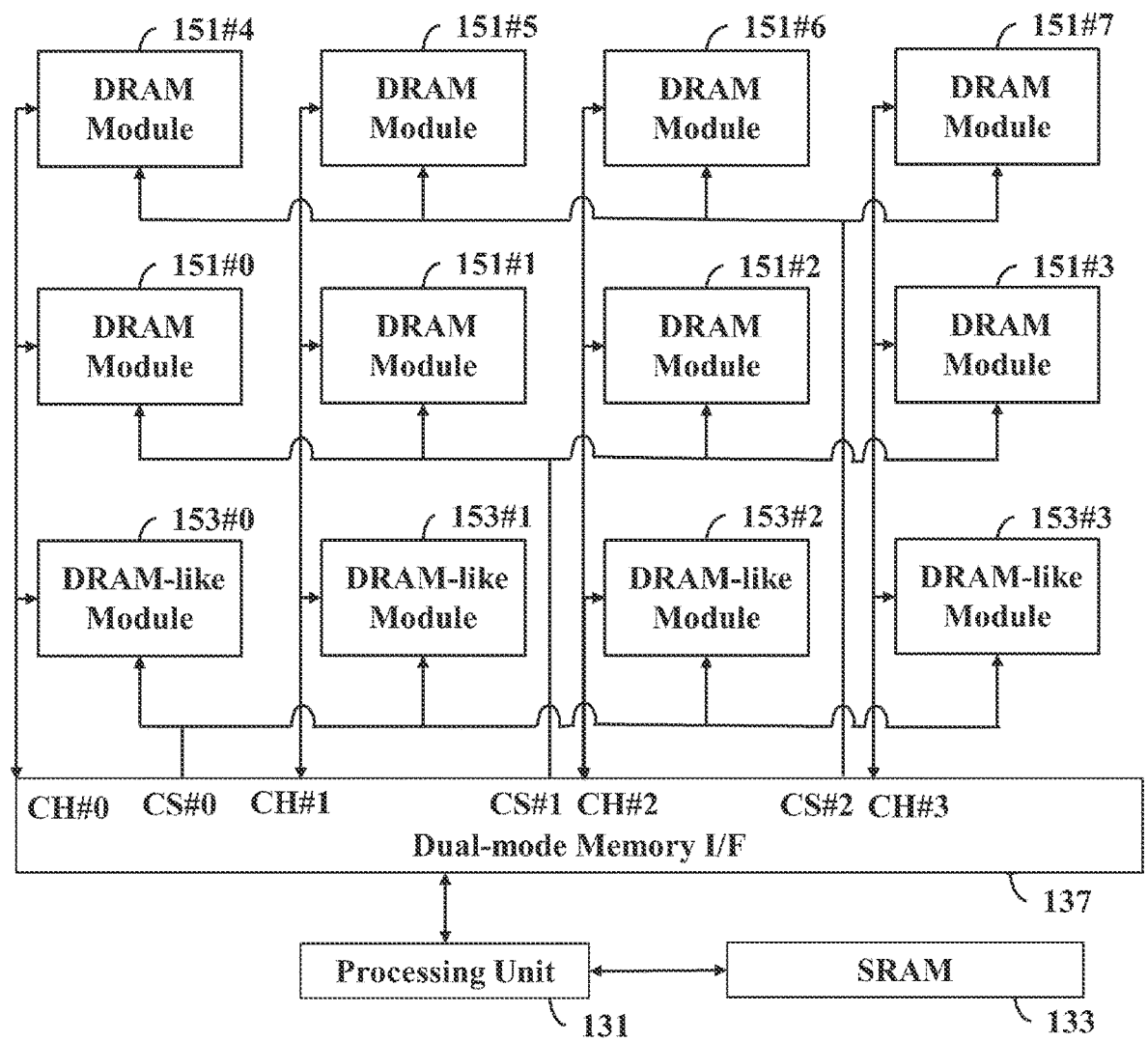
FIG. 4 illustrates a configuration of connections between a dual-mode memory I/F, a Dynamic Random Access Memory (DRAM) and a DRAM-like memory according to an embodiment of the invention.

FIG. 4 illustrates a configuration of connections between the dual-mode memory I/F 137, the DRAM 151 and the DRAM-like memory 153 according to an embodiment. The dual-mode memory I/F 137 may include I/O channels CH #0 to CH #3. Each channel CH may be connected to the same type or different types of memory modules, for example, one DRAM-like memory module and two DRAM modules. For example, the channel CH #0 is connected to the DRAM-like memory module 153 #0 and two DRAM modules 151 #0 and 151 #4. In other words, different types of memory modules can share one channel. With this connection configuration, the memory modules of multiple channels CH may be accessed in a multi-channel mode to improve the data access performance. The processing unit 131 may issue the CS signal CS #0 and access data of the DRAM-like modules 153 #0 to 153 #3 of the channels CH #0 to CH #3 in a multi-channel mode. The processing unit 131 may issue the CS signal CS #1 and access data of the DRAM modules 151 #0 to 151 #3 of the channels CH #0 to CH #3 in a multi-channel mode.

Figure 5:
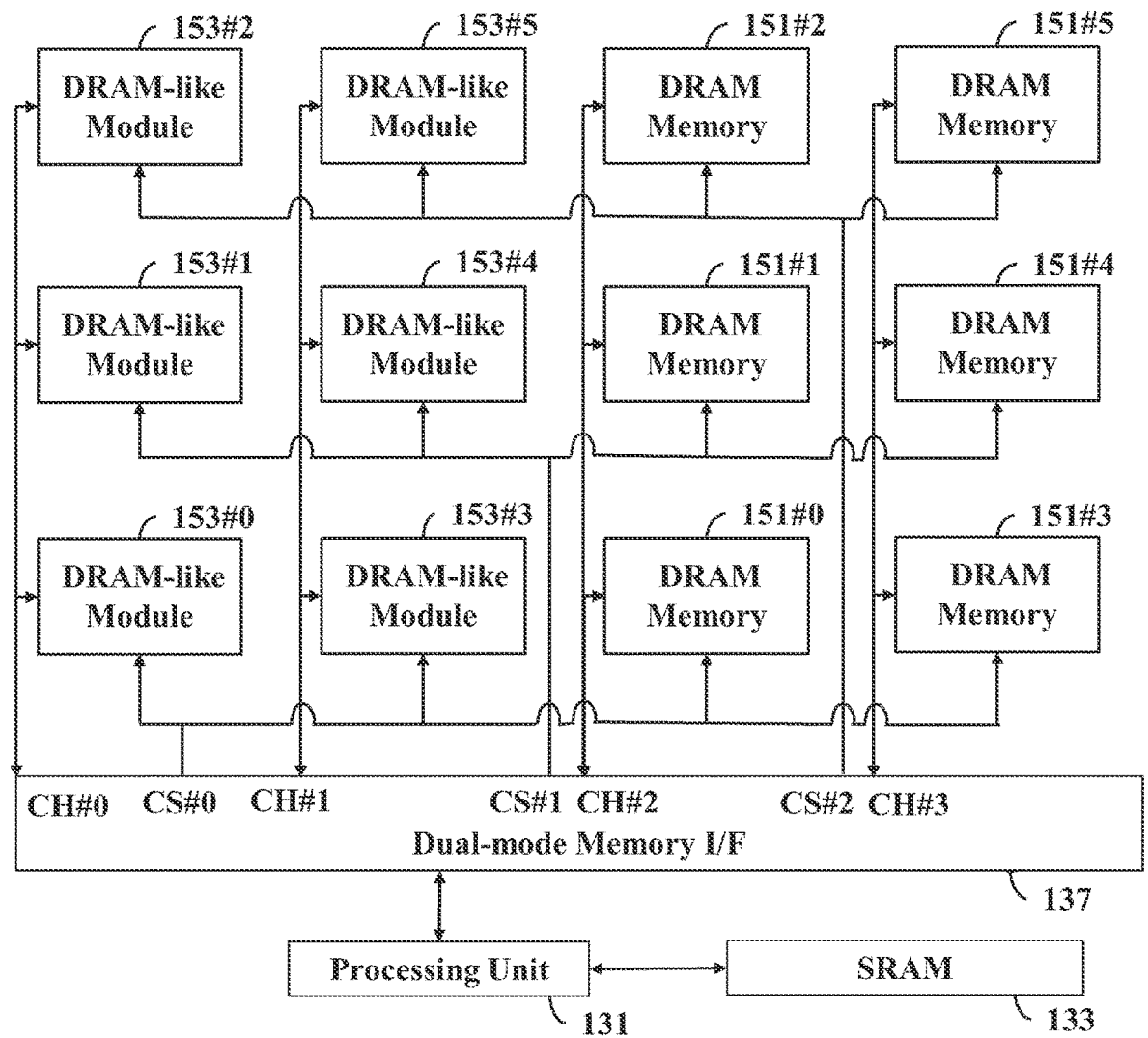
FIG. 5 illustrates a configuration of connections between a dual-mode memory I/F, a DRAM and a DRAM-like memory according to another embodiment of the invention.

FIG. 5 illustrates a configuration of connections between the dual-mode memory I/F 137, the DRAM 151 and the DRAM-like memory 153 according to another embodiment. Each channel is connected to the same type of memory modules only, for example, each of the channels CH #0 and CH #1 is connected to the DRAM-like modules only and each of the channels CH #2 and CH #3 is connected to the DRAM modules only. With this connection configuration, storage modules of multiple channels may be accessed in a multi-channel mode to improve the data access performance. The processing unit 131 may issue the CS signal CS #0 and access DRAM-like modules 153 #0 and 153 #3 of the channels CH #0 and CH #1 in a multi-channel mode. The processing unit 131 may issue the CS signal CS #0 and access DRAM modules 151 #0 and 151 #3 of the channels CH #2 and CH #3 in a multi-channel mode.

The dual-mode memory I/F 137 is equipped with 51 pings and Table 2 shows the pin functions of the dual-mode memory I/F:

TABLE 2

| Pin Number | DDR4 | DRAM-like I/F |
|---|---|---|
| 0-7 | Data[0:7] | Data[0:7] |
| 8 | CS | CS |
| 9 | RAS# | Select_In |
| 10 | CAS# | CA |
| 11 | Clock | Clock |
| 12 | Clock_c | Clock_c |
| 13 | Reset# | Reset# |
| 14 | CKE | CKE |
| 15 | ODT | ODT |
| 16 | Alert | Alert |
| 17 | x | Select_Out |
| 18 | DQS# | DQS# |
| 19 | ZQ | ZQ |
| 20 | WP# | x |
| 21 | DTQS | x |
| 22-24 | Chip ID [0:2] | x |
| 25 | ACT | x |
| 26 | DM | x |
| 27 | DBI | x |
| 28-29 | BG[0-1] | x |
| 30-31 | BA[0-1] | x |
| 32-47 | A[0-17] | x |
| 48 | DTQS | x |

TABLE 2-continued

| Pin Number | DDR4 | DRAM-like I/F |
|---|---|---|
| 49 | PAR | x |
| 50 | TEN | x |

As shown in Table 2, the dual-mode memory I/F 137 may be configured as DDR4, thereby enabling the processing unit 131 to communicate with the DRAM modules each other. In addition, the dual-mode memory I/F 137 may be configured as a DRAM-like I/F, thereby enabling the processing unit 131 to communicate with the DRAM-like modules each other. The dual-mode memory I/F 137 may include registers mapping to pins of the memory modules, enabling the processing unit 131 to set output parameters to designated pins of the memory modules, for example, the predefined voltage level, the triggering type (such as assertion, de-assertion or no-function), the swinging (Y/N), and the like. In an example, suppose that the dual-mode memory I/F 137 is configured as DDR4, the processing unit 131 may set the corresponding register to adjust the predefined voltage output to the pin #15 to a high or low voltage. The processing unit 131 may set the triggering type and the swinging (Y/N) for the pin #15 to no-function and NO through the corresponding registers, respectively. Suppose that the dual-mode memory I/F 137 is configured as the DRAM-like I/F, the processing unit 131 may set the corresponding register to adjust the predefined voltage output to the pin #15 to a low voltage. The processing unit 131 may set the triggering type and the swinging (Y/N) for the pin #15 to assertion and NO through the corresponding registers, respectively. In another example, suppose that the dual-mode memory I/F 137 is configured as DDR4, the processing unit 131 may set the corresponding registers to configure the swinging (Y/N) as YES and adjust the clock frequency to a frequency that can be supported by the DRAM modules for the pin #11. Suppose that the dual-mode memory I/F 137 is configured as the DRAM-like I/F, the processing unit 131 may set the corresponding registers to configure the swinging (Y/N) as YES and adjust the clock frequency to a frequency that can be supported by the DRAM-like modules for the pin #11.

Each memory module may feed-in an independent CS signal. The processing unit 131 may access data stored in the memory modules of different channels CH #0 to CH #3 through the dual-mode memory I/F 137 in parallel. Specifically, the processing unit 131 issues one of the CS signals CS #0 to CS #3 to enable the designated memory module of every channel, and then, access data stored in the enabled memory modules in parallel through the shared data buses Data[0:7] of the channels CH #0 to CH #3. In addition, each channel can be used to exchange control signals with the enabled memory modules, such as Command Address (CA), Reset, Wake, Alert, Select_In, Select_Out, Chip ID, Activation Command Input (ACT), Input Data Mask (DM), Data Bus Inversion (DBI), Bank Group (BG), Bank Address, Address Input, Command and Address Parity Input (PAR), Test Mode Enable, etc.

Based on the connections as shown in FIG. 4, the processing unit 131 may employ different communications protocols or use different operating modes to drive different types of the memory modules. Before another type of the memory modules are enabled, the processing unit 131 may reconfigure the dual-mode memory I/F 137. For example, the processing unit 131, in the system booting, configures the dual-mode memory I/F 137 in the operating mode for accessing data of the DRAM-like modules 153. Next to the successful configurations, the processing unit 131 drives the dual-mode memory I/F 137 to issue the CS signal CS #0 to enable the DRAM-like modules 153 #0 to 153 #3, and then, obtain program instructions, mapping tables, data and the like required in the system booting therefrom. After the system has been boot successfully, the processing unit 131 may reconfigure the dual-mode memory/F 137 in the operating mode for accessing data of the DRAM modules 151. Next to the successful reconfigurations, the processing unit 131 drives the dual-mode memory I/F 137 to issue the CS signal CS #1 or CS #2 to enable the DRAM modules 151 #0 to 151 #3 or 151 #4 to 151 #7, and then, temporarily store user data provided from the host 110, which is to be written into the flash memory 171, user data read from the flash memory 171, which is to be clocked out to the host 110, or a portion of L2P table for look-up. During the retrieval of user data, if attempting to obtain the program instructions, the mapping tables or data of the DRAM-like modules 153, the processing unit 131 may reconfigure the dual-mode memory I/F 137 in the operating mode for accessing data of the DRAM-like modules 153 before issuing the CS signal CS #0 to enable the flash-like modules 173.

In some embodiments, suppose that the processing unit 131 is a multiprocessor capable of parallel computations, each processor core may handle designated channels to access data of a portion of memory modules. For example, one core is responsible for handling the channels CH #0 and CH #1 while another core is responsible for handling the channels CH #2 and CH #3. In alternative embodiments, suppose that the connections between the processing unit 131 and the memory modules are configured as shown in FIG. 5, one or more cores are dedicated to access data of the DRAM modules while the other cores are dedicated to access data of the DRAM-like modules. Thus, the connection configurations as shown in FIG. 5 make the processing unit 131 spend no time to reconfigure the dual-mode memory I/F 137. But, comparing with the connections as shown in FIG. 4, the bandwidth for parallel processes of the dual-mode memory I/F 137 is reduced.

Information and program instructions required in system booting, such as information block, the whole L2P table and In-System Programming (ISP) code etc., are usually stored in a nonvolatile storage unit. In some implementations, the necessary information and program instructions are stored in the flash memory 171. To shorten the time of system booting, the necessary information and program instructions can be stored in the hybrid memory of the system architecture 100 introduced in the embodiments of the invention. The information block may record parameters for configuring the flash memory 171, such as bad block and column locations, the superblock architecture of the flash memory 171, etc., as well as parameters for configuring the DRAM 151.

Refer to FIG. 1. In some embodiments, the data storage device may be equipped with the DRAM 151, the hybrid memory 153 or 173 and the flash memory 171. The whole L2P table is preferably stored in the hybrid memory 153 or 173 for accelerating the access to the L2P table. The hybrid memory 153 or 173 may also be utilized as flush storage space, such that data of the DRAM 151 can be fast flushed to the hybrid memory 153 or 173 when a Sudden Power Off (SPO) event occurs. The DRAM 151 may be used to store hot data, and user data come from the host 110 temporarily. The flash memory 171 is main storage space for backing-up ISP codes, cold data and/or seldom used data.

In some embodiments, the data storage device may be equipped with the hybrid memory 153 and the flash memory 171. The whole L2P table is preferably stored in the hybrid memory 153 for accelerating the access to the L2P table. Since the hybrid memory 153 has long-time data-storage capability, the data storage device can ignore processes responding to a SPO event. The hybrid memory 153 may be used to further store a small amount of hot data, or user data come from the host 110. The flash memory 171 is main storage space for backing-up ISP codes, cold data and/or seldom used data.

Figure 6:
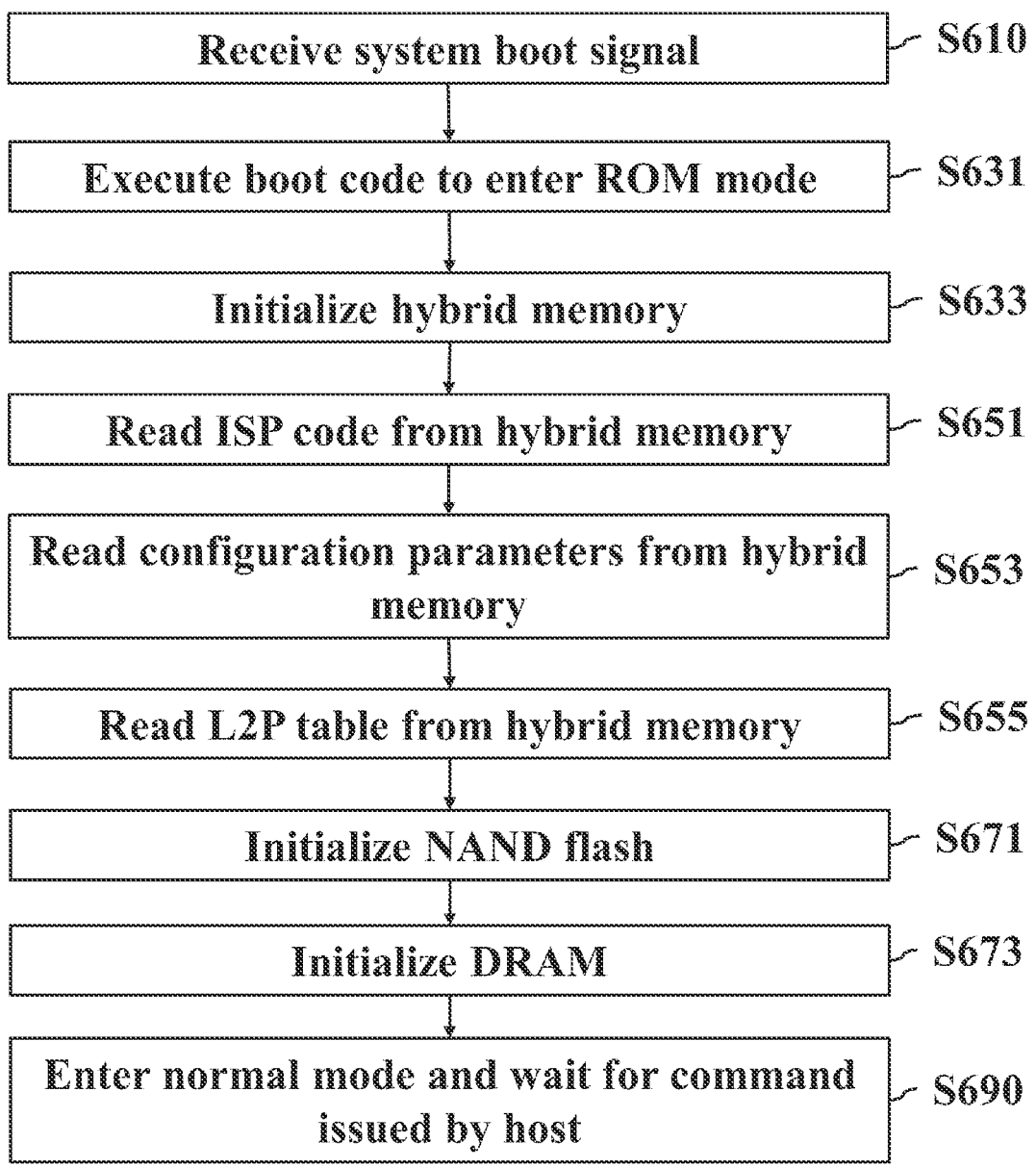
FIG. 6 is a flowchart illustrating a method for booting a system equipped with a data storage device including a DRAM according to an embodiment of the invention.

Refer to FIG. 6. After receiving a signal indicating the system boot (step S610), the processing unit 131 may read and execute boot code from a Read Only Memory (ROM) to enter a ROM mode (step S631). In the ROM mode, the hybrid memory 153 or 173 is initialized (step S633). In step S633, the processing unit 131 may detect the types of all storage units being connected thereto through an integrated interface first, for example, the types of the storage modules 171 #0 to 171 #7 and 173 #0 to 173 #5 and the memory modules 151 #0 to 151 #7 and 153 #0 to 153 #5, so as to find out the hybrid memory 153 or 173. In some embodiments, the processing unit may detect a voltage level of a specific pin of an enabled memory or storage module through the hardware of the dual-mode memory interface 137 or the dual-mode flash interface 139 to determine whether the enabled memory or storage module belongs to a hybrid memory. For example, the processing unit 131 may detect a voltage level of the pin #14 of an enabled storage module through the hardware of the dual-mode flash interface 139. If the voltage level is low, then the processing unit 131 determines that the enabled storage module is a flash module. Otherwise, the processing unit 131 determines that the enabled storage module is a flash-like module. In alternative embodiments, the processing unit 131 may issue a command that can be recognized by a hybrid memory to an enabled memory or storage module through the dual-mode memory interface 137 or the dual-mode flash interface 139, and determine whether the enabled memory or storage module belongs to a hybrid memory according to a reception of a correct or incorrect reply. Subsequently, the processing unit 11 reads the ISP code, the configuration parameters and the L2P table from the hybrid memory 153 or 173 (steps S651, S653 and S655) and initializes the flash memory 171 and the DRAM 151 according to the configuration parameters (steps S671 and S673). The processing unit 131 subsequently executes the ISP code to enter a normal mode and waits for a command issued by the host 110 (step S690). In some embodiments of the normal mode, for accelerating a search and an update of the L2P table, a portion of L2P table being or to be used may be stored in the DRAM 151 temporarily, and at a proper time point, flushed back to the hybrid memory 153 or 173. In addition, a portion of a physical-logical mapping (P2L) table that is required in a lookup or an update may be stored in the DRAM 151 or the Static Random Access Memory (SRAM) 133 temporarily. The DRAM 151 may store user data that the host 110 attempts to write, and later, the processing unit 131 may program the temporarily stored data into the hybrid memory 153 or 173 or the flash memory 171 in terms of characteristics of the user data.

Figure 7:
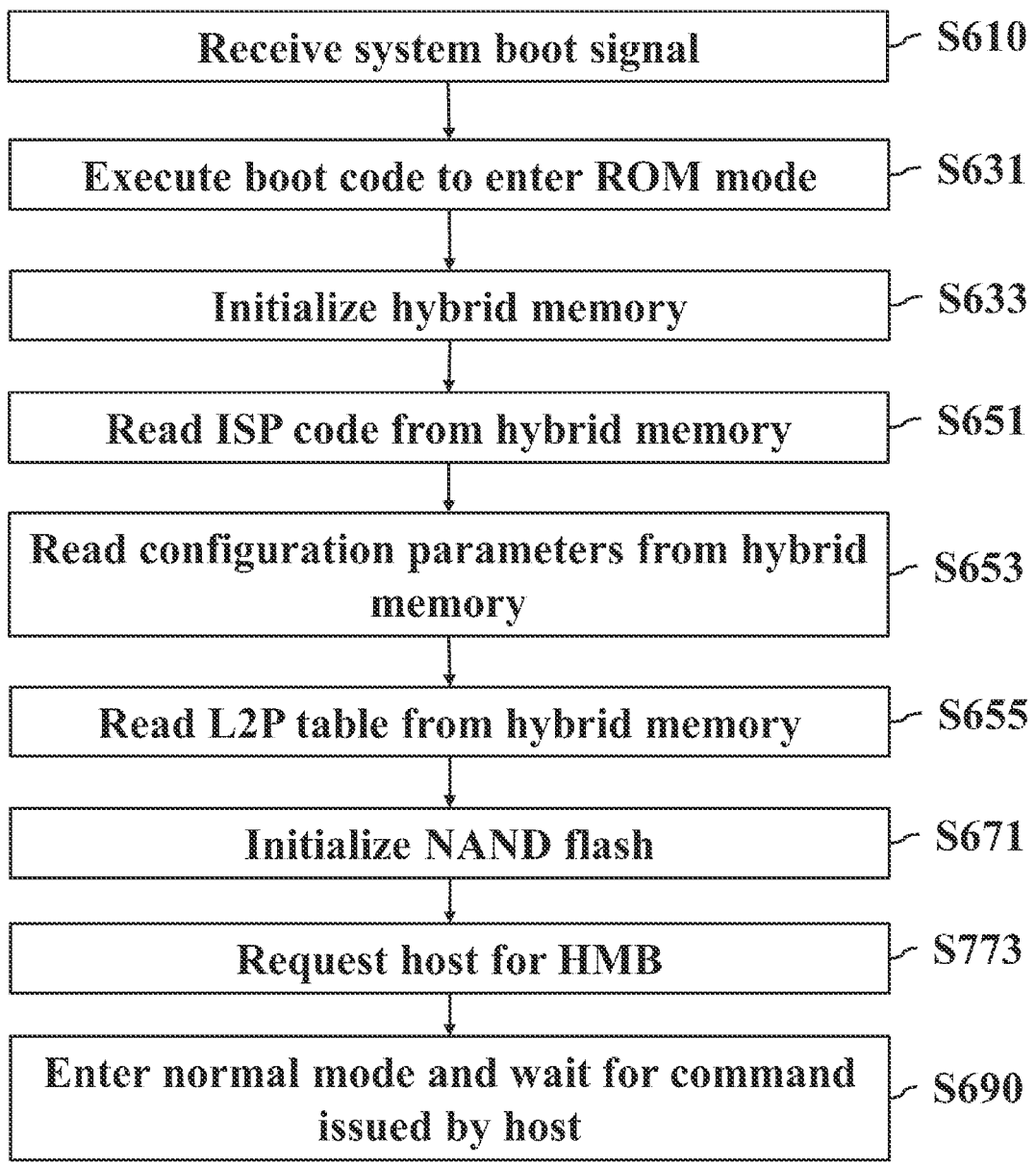
FIG. 7 is a flowchart illustrating a method for booting a system equipped with a data storage device including no DRAM according to an embodiment of the invention.

Refer to FIG. 1. In alternative embodiments, the data storage device may be equipped with the hybrid memory 153 or 173 and the flash memory 171, but no DRAM 151. The whole L2P table is stored in the hybrid memory 153 or 173 permanently. The hybrid memory 153 or 173 may provide storage space for fast flush and the flash memory 171 may provide main storage space. Refer to FIG. 7. Since no DRAM is disposed on the data storage device, the processing unit 131 cannot execute step S673 as shown in FIG. 6. Instead, the processing unit 131 may request the host 110 for allocating a portion of DRAM space of a host side as a Host Memory Buffer (HMB) (step S773). In some embodiments of the normal mode, for accelerating a search and an update of the L2P table, a portion of L2P table being or to be used may be stored in the HMB temporarily, and at a proper time point, flushed back to the hybrid memory 153 or 173. In addition, a portion of a P2L table that is required in a lookup or an update may be stored in the HMB or the SRAM 133 temporarily. The HMB may store user data that the host 110 attempts to write, and later, the processing unit 131 may program the temporarily stored data into the hybrid memory 153 or 173 or the flash memory 171 in terms of characteristics of the user data.

Steps S610 to S673 of FIG. 6 and steps S610-S671 and S773 of FIG. 7 may be referred to as steps performed in a system booting stage.

In some embodiments of the normal mode, the SRAM 133 may be used to temporarily store data to be programmed into the flash memory 171 or the hybrid memory 153 or 173 and data read from the flash memory 171 or the hybrid memory 153 or 173. Direct Access Memory (DMA) techniques are employed to move data between these two components.

In some embodiments of the normal mode, the processing unit 131 may execute the same WL algorithm to manage the flash memory 171 and the flash-like memory 173. The SRAM 133 may store a Program/Erase (P/E) count for each physical block of the flash memory 171 and the flash-like memory 173. But, the thresholds for triggering the WL process for the physical blocks of the flash memory 171 and the flash-like memory 173, respectively, may be the same or different.

In some embodiments of the normal mode, the processing unit 131 may perform GC processes for the flash memory 171 and the flash-like memory 173. The processing unit 131 may allocate a portion of space of the hybrid memory 153 or 173 as over provision for a buffer in data movements or other operations.

In some embodiments of the normal mode, for Sudden Power Off Recovery (SPOR), the processing unit 131 may program data of the DRAM 151 or HMB into the non-volatile hybrid memory 153 or 173 or flash memory 171 periodically, or when a predefined condition has been met. The temporarily stored L2P table and user data are preferably programmed into the hybrid memory 153 or 173, thereby enabling the SPOR process to be performed more efficiently after a SPO.

In some embodiments, when available space of the hybrid memory 153 or 173 is sufficient, the processing unit 131 may not use the flash memory 171. The flash memory 171 is initialized and space of the flash memory 171 is used until the available space of the hybrid memory 153 or 173 is insufficient.

Some or all of the aforementioned embodiments of the method of the invention may be implemented in a computer program such as a driver for a dedicated hardware of a controller, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 to 5, it should be noted that additional elements may be included to achieve better performance without departing from the spirit of the invention. Each element of FIGS. 1 to 5 is composed of various circuits and arranged to operably perform the aforementioned operations. While the process flows described in FIGS. 6 and 7 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for controlling different types of storage units, comprising:
    an interface connected to at least two different types of storage units, wherein the storage units comprise a single level cell (SLC) flash memory and flash memory; and
    a processing unit coupled to the interface, arranged to operably access data of the different types of the storage units through the interface,
    wherein the SLC flash memory stores parameters required for configuring the flash memory, and In-System Programming (ISP) code,
    wherein the processing unit is arranged to operably initialize the SLC flash memory; read a first parameter for configuring the flash memory, and an In-System Programming (ISP) code from the SLC flash module; initialize the flash module according to the first parameter; and execute the ISP code to enter a normal mode and wait for a command issued by a host.

2. The apparatus of claim 1, wherein the interface comprises a plurality of channels, each channel is connected to a flash module and a SLC flash module, the flash modules of different channels are enabled by a first signal, and the SLC flash modules of different channels are enabled by a second signal.

3. The apparatus of claim 2, wherein the processing unit is arranged to operably configure the interface in an operating mode for accessing data of the flash module before enabling the flash module by the first signal; and configure the interface in an operating mode for accessing data of the SLC flash module before enabling the SLC flash module by the second signal.

4. The apparatus of claim 3, wherein an initialization of the SLC flash memory, a reading of the first parameter and the ISP code from the SLC flash module, an initialization of the flash module and an execution of the ISP code are performed during a system booting stage.

5. The apparatus of claim 1, wherein the interface comprises a first channel and a second channel, the first channel is connected to flash modules only, and the second channel is connected to SLC flash modules only.

6. The apparatus of claim 5, wherein the processing unit comprises a first core and a second core, the first core is arranged to operably control the first channel and the second core is arranged to operably control the second channel.

7. The apparatus of claim 6, wherein an initialization of the SLC flash memory, a reading of the first parameter and the ISP code from the SLC flash module, an initialization of the flash module and an execution of the ISP code are performed during a system booting stage.

8. The apparatus of claim 1, wherein the SLC flash memory is arranged to operably store a logical-physical address mapping (L2P) table.

9. An apparatus for controlling different types of storage units, comprising:
    an interface connected to at least two different types of storage units, wherein the storage units comprises a Phase-Change Memory (PCM) or a magnetoresistive memory, and a Dynamic Random Access Memory (DRAM); and
    a processing unit coupled to the interface, arranged to operably access data of the different types of the storage units through the interface,
    wherein the PCM or the magnetoresistive memory stores parameters required for configuring the DRAM, and In-System Programming (ISP) code.

10. The apparatus of claim 9, wherein the interface comprises a plurality of channels, each channel is connected to a DRAM module, and a PCM module or a magnetoresistive memory module, the DRAM modules of different channels are enabled by a first signal, and the PCM modules or the magnetoresistive memory modules of different channels are enabled by a second signal.

11. The apparatus of claim 10, wherein the processing unit is arranged to operably configure the interface in an operating mode for accessing data of the DRAM module before enabling the DRAM module by the first signal; and configure the interface in an operating mode for accessing data of the DRAM-like module before enabling the DRAM-like module by the second signal.

12. The apparatus of claim 11, wherein the processing unit is arranged to operably, during a system booting stage, initialize the PCM or the magnetoresistive memory; read a first parameter for configuring the DRAM, and an In-System Programming (ISP) code from the PCM or magnetoresistive memory module; initialize the DRAM according to the first parameter; and execute the ISP code to enter a normal mode and wait for a command issued by a host.

13. The apparatus of claim 9, wherein the interface comprises a first channel and a second channel, the first channel is connected to the DRAM modules only, and the second channel is connected to the PCM or magnetoresistive memory modules only.

14. The apparatus of claim 13, wherein the processing unit comprises a first core and a second core, the first core is arranged to operably control the first channel and the second core is arranged to operably control the second channel.

15. The apparatus of claim 14, wherein the processing unit is arranged to operably, during a system booting stage, initialize the PCM or the magnetoresistive memory; read a first parameter for configuring the DRAM, and an In-System Programming (ISP) code from the PCM or magnetoresistive memory module; initialize the DRAM according to the first parameter; and execute the ISP code to enter a normal mode and wait for a command issued by a host.

16. The apparatus of claim 9, wherein the PCM or the magnetoresistive memory is arranged to operably store a logical-physical address mapping (L2P) table.

17. A method for controlling different types of storage units, performed by a processing unit when loading and executing software or firmware instructions, comprising:
configuring an interface in a first operating mode, wherein the interface comprises a plurality of channels, each channel is connected to a first type and a second type of storage units, and the first operating mode corresponds to the first type of storage units;
driving the interface to issue a first signal to enable the first type of storage units of different channels;
driving the interface to access data of the first type of storage units; and
reconfiguring the interface in a second operating mode corresponding to the second type of storage units before accessing data of the second type of storage units,
wherein a configuration or a reconfiguration of the interface comprises setting or resetting a pin function of the interface.

18. The method of claim 17, wherein the first type of storage unit is a single level cell (SLC) flash module, the second type of storage unit is a flash module, the processing unit is arranged to operably configure the interface in a first operating mode and drive the interface to access parameters for configuring the flash module from the SLC flash module when a system boots, and the processing unit is arranged to operably configure the interface in a second operating mode after the system boots successfully.

19. The method of claim 17, wherein the first type of storage unit is a Phase-Change Memory (PCM) or magnetoresistive memory module, the second type of storage unit is a DRAM module, the processing unit is arranged to operably configure the interface in a first operating mode and drive the interface to access parameters for configuring the DRAM module from the PCM or magnetoresistive memory module when a system boots, and the processing unit is arranged to operably configure the interface in a second operating mode after the system boots successfully.

20. The method of claim 17, wherein the first type of storage unit is arranged to operably store parameters required for configuring the second type of storage unit, In-System Programming (ISP) code, and a logical-physical address mapping (L2P) table.

* * * * *